United States Patent
Featonby et al.

(10) Patent No.: US 10,673,694 B2
(45) Date of Patent: Jun. 2, 2020

(54) PRIVATE NETWORK MIRRORING

(71) Applicant: Amazon Technologies, Inc., Seattle, WA (US)

(72) Inventors: Malcolm Featonby, Sammamish, WA (US); Manish Singh Rathaur, Kirkland, WA (US); Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/992,019

(22) Filed: May 29, 2018

(65) Prior Publication Data
US 2019/0372835 A1   Dec. 5, 2019

(51) Int. Cl.
| G06F 15/173 | (2006.01) |
| H04L 12/24 | (2006.01) |
| H04L 29/08 | (2006.01) |
| H04L 12/46 | (2006.01) |

(52) U.S. Cl.
CPC ...... *H04L 41/0806* (2013.01); *H04L 41/0816* (2013.01); *H04L 41/0893* (2013.01); *H04L 41/12* (2013.01); *H04L 67/1095* (2013.01); *H04L 67/34* (2013.01); *H04L 12/4641* (2013.01)

(58) Field of Classification Search
CPC . H04L 41/0803; H04L 41/0806; H04L 67/34; H04L 41/0893; H04L 41/0816; H04L 67/1095
See application file for complete search history.

(56) References Cited

U.S. PATENT DOCUMENTS

| 7,805,583 B1 | 9/2010 | Todd |
| 9,075,788 B1 * | 7/2015 | Roth .................. G06F 11/3006 |
| 9,240,929 B2 | 1/2016 | Brandwine |
| (Continued) | | |

FOREIGN PATENT DOCUMENTS

WO    2012087941 A1    6/2012

OTHER PUBLICATIONS

International Search Report and Written Opinion for related International Application No. PCT/US2019/034133, dated Sep. 13, 2019, 15 pages.

(Continued)

*Primary Examiner* — Cheikh T Ndiaye
(74) *Attorney, Agent, or Firm* — Nicholson De Vos Webster & Elliott LLP

(57) ABSTRACT

Techniques for private network mirroring are described. Users can select one or more existing private networks to be mirrored in the same or different network area. Any network configuration changes made in the selected private network (e.g., "master" private network) can be propagated automatically to the mirror private network. This enables users to utilize resources in another network area for disaster recovery, ensuring that the network configuration of the mirror private network is consistent with the master private network through real-time updates. Additionally, users managing infrastructure that includes multiple private networks can select one master private network and propagate configuration changes to other private networks, reducing management overhead incurred by these multi-private network installations.

16 Claims, 12 Drawing Sheets

(56) References Cited

U.S. PATENT DOCUMENTS

| | | | |
|---|---|---|---|
| 2006/0077955 A1* | 4/2006 | Poustchi | H04L 29/06027 370/352 |
| 2009/0276771 A1* | 11/2009 | Nickolov | G06F 9/4856 717/177 |
| 2012/0310887 A1* | 12/2012 | Taranov | G06F 11/2028 707/634 |
| 2013/0246838 A1 | 9/2013 | Reddy | |
| 2014/0325037 A1 | 10/2014 | Elisha | |
| 2016/0306719 A1 | 10/2016 | Laicher et al. | |
| 2016/0380815 A1* | 12/2016 | Agarwal | H04L 45/60 709/220 |
| 2017/0168907 A1 | 6/2017 | Harper | |
| 2018/0276085 A1 | 9/2018 | Mitkar | |
| 2019/0205180 A1 | 7/2019 | Macha | |

OTHER PUBLICATIONS

Non-Final Office Action for U.S. Appl. No. 15/992,010, dated Dec. 10, 2019, 28 pages.

\* cited by examiner

| AVAILABILITY GROUP DEFINITIONS 500 |
|---|
| AVAILABILITY GROUP 1 502A<br><br>TAGS 504A: <ONE OR MORE TAGS ASSOCIATED WITH RESOURCE INSTANCES}<br><br>RESOURCE IDENTIFIER 506A: <ONE OR MORE INSTANCE IDENTIFIERS><br><br>DYNAMIC FILTER 508A: <ACCOUNT, TAG, HARDWARE CHARACTERISTICS, RESOURCE CHARACTERISTICS><br><br>CRITICALITY 509A: <CRITICALITY VALUE><br><br>NOTIFICATION 511A: <ENTITIES TO NOTIFY> |
| AVAILABILITY GROUP 2 502B<br><br>TAGS 504B: <ONE OR MORE TAGS ASSOCIATED WITH RESOURCE INSTANCES}<br><br>RESOURCE IDENTIFIER 506B: <ONE OR MORE INSTANCE IDENTIFIERS><br><br>DYNAMIC FILTER 508B: <ACCOUNT, TAG, HARDWARE CHARACTERISTICS, RESOURCE CHARACTERISTICS><br><br>CRITICALITY 509B: <CRITICALITY VALUE><br><br>NOTIFICATION 511B: <ENTITIES TO NOTIFY> |
| BACKUP PARAMETERS 510<br><br>SOURCE 512: <ZONE OR REGION IDENTIFIER><br><br>DESTINATION 514: <ZONE OR REGION IDENTIFIER><br><br>REPLICATION FREQUENCY 516: <CONTINUOUS OR PERIODIC><br><br>BACKUP TYPE 518: <RESERVATION OR ON DEMAND><br><br>FAILOVER SEQUENCE 520: <AVAILABILITY GROUP ORDER> |

*FIG. 5*

PRIVATE NETWORK MIRRORING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 5 is an example of availability group definitions according to some embodiments.

DETAILED DESCRIPTION

Various embodiments of methods, apparatus, systems, and non-transitory computer-readable storage media for private network mirroring are described. According to some embodiments, users can select one or more existing private networks to be mirrored in the same or different network area. Any network configuration changes made in the selected private network (e.g., "master" private network) can be propagated automatically to the mirror private network. This enables users to utilize resources in another network area for disaster recovery, ensuring that the network configuration of the mirror private network is consistent with the master VPC through real-time updates. Additionally, users managing infrastructure that includes multiple private networks can select one master private network and propagate configuration changes to other private networks, reducing management overhead incurred by these multi-VPC installations.

Once a user has selected the master private network (in the same or different area as the mirror private network), embodiments can track and report configuration differences between the master and the mirror and provide automated and/or manual propagation of the configuration differences to the mirror private network. Further, this tracking and reporting of configuration differences enables an existing private network to be mirrored by an existing private network. In some embodiments, manual propagation can support mapping resources from one networking area to another for resources that require additional configuration information to be mirrored (e.g., subnet range mappings may be manually entered before mirroring across regions or networks).

Figure 1:
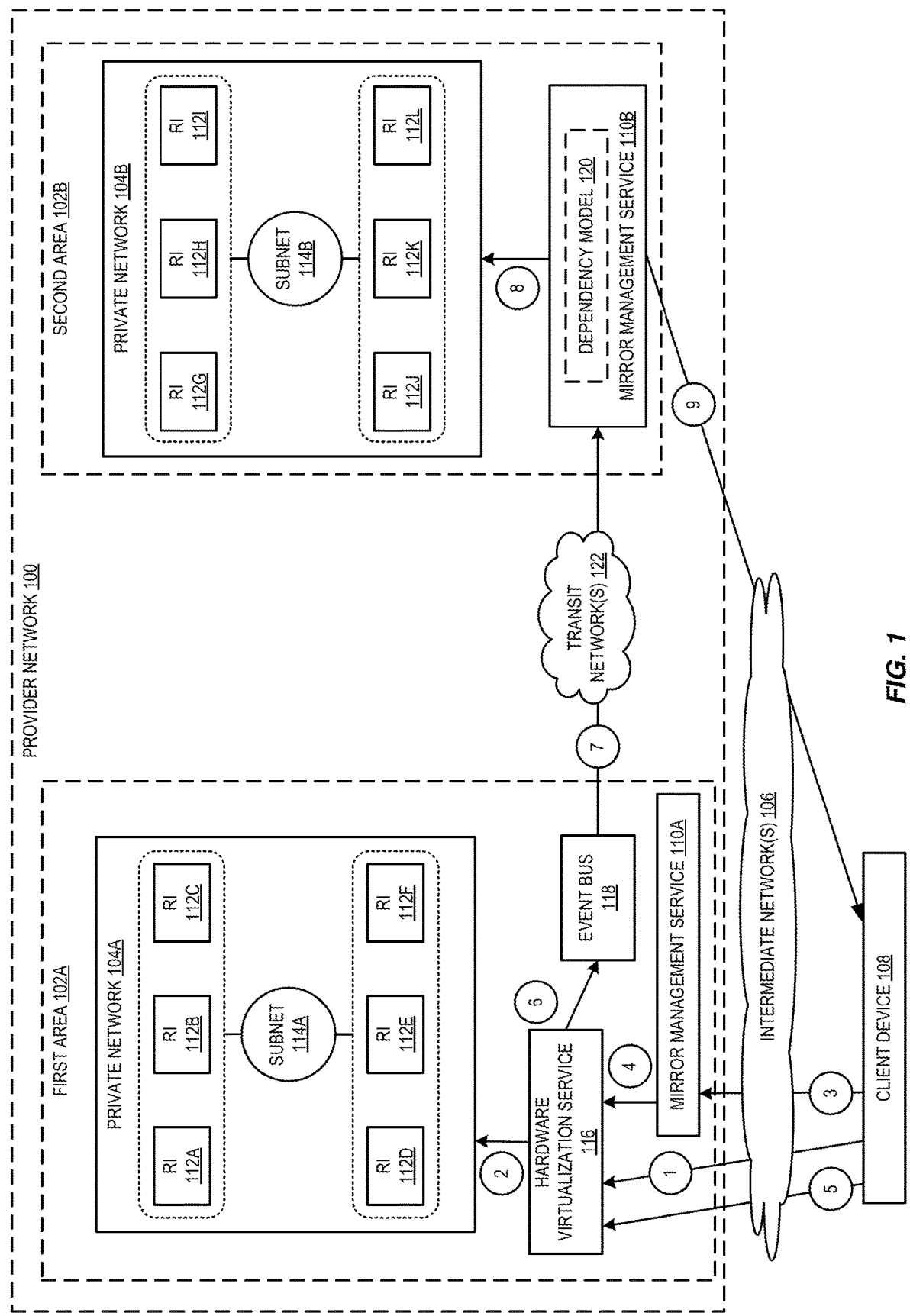
FIG. 1 is a diagram illustrating an environment for private network mirroring according to some embodiments.

FIG. 1 is a diagram illustrating an environment for private network mirroring according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a provider network 100 may make available various resources to users. For example, in FIG. 1, provider network 100 includes a first area 102A and a second area 102B. Each area may be logically isolated from the other (and from any other areas not shown) within provider network 100. For example, each area may be a distinct logical data center, supported by one or more physical data centers, and each area may have its own power supply and networking infrastructure to limit the likelihood of a failure in one area from affecting another area. In some embodiments, the first and second areas 102A and 102B may be located in the same region of provider network 100 which may include resources located in the same geographic area (e.g., state, country, etc.). By dividing provider network 100 into various regions and areas, the data and customer instances stored therein can be protected against failure events. For example, a failure in the first area 102A may not impact the resources in the second area 102B. Likewise, a failure in one geographic region may not affect resources located in another geographic region. To take advantage of these divisions, a user's resources in one area can be mirrored in a different area. As used herein, an area of a provider network may refer to a logically and/or geographically distinct portion of the provider network (e.g., different region, rack, aisle, floor, building, city, etc).

At numeral 1, a user can send a request from client device 108 to provider network 100 to create private network 104A. Private network 104A may include various resource instances ("RI") 112A-112F, and other resources such as subnet 114A. A resource instance can be a compute instance such as a VM or container. In some embodiments, the request may be sent to hardware virtualization service 116, and may be any of a variety of types of messages using any of a variety of types of protocols (e.g., a HyperText Transfer Protocol (HTTP) "GET" or "POST" request message). Hardware virtualization service 116 provides various resources to customers, such as virtual machine (VM) instances, storage and database instances, etc. In some embodiments, hardware virtualization service 116 may provide one or more APIs, for example a web services interface (e.g., made available at an API endpoint of the provider network 100), through which the client device can access functionality provided by the hardware virtualization service 116, for example via an internet browser and/or console (e.g., a web-based application, standalone application, mobile application, etc.). As shown at numeral 2, hardware virtualization service 116 can provide the requested resources 112A-112F and subnet 114A in private network 104A.

If a failure occurs in the first area 102A, then the resources 112A-112F may become unavailable. Depending on the use to which the resources are being put, this may negatively impact the customer. For example, the resources may support or operate a website or web application created by the customer. If these resources are no longer available, the website or web application may not be accessible by the customer's users. To protect against the unlikely event of a failure, backup resources can be provided in a different area, such as second area 102B. These resources may be located in geographically and/or logically distinct locations to ensure that a failure affecting the first area 102A is unlikely to affect the second area 102B. In some service provider systems, to keep backups in synch across regions, a user or administrator would have to manually make changes to the backup region (e.g., the second area 102B) if changes were made to the master region (e.g., the first area 102A). This requires significant time and effort on the part of the user to ensure that all changes are propagated correctly. Additionally, this can lead to errors which may not be noticeable until a failure event causes the backup resources to be used. If the backup has become out of sync with the master, then the backup will need to be reconfigured during the failure, which may cause additional down time for the customer.

Mirroring enables an association between two or more private networks to be selected, in which one private network is designated as the master and one or more private networks in the same or different area are designated as mirrors. In some embodiments, if the mirror is located in the same area, then it may be purposefully placed using a technique to improve reliability—e.g., placing the mirror in a different region, rack, aisle, floor, building, city, etc. as the master. As shown at numeral 3, the client device can send a request to mirror management service 110A to designate the private network 104A as the master. In some embodiments, the request may designate private network 104B as the mirror or may designate a yet-to-be-created private network in another area. In some embodiments, rather than identifying a specific mirror private network, the request may include another area (or region, rack, aisle, etc.) identifier in which the mirror private network is to be created. At numeral 4, mirror management service 110A can instruct hardware virtualization service 116 to provide any changes made to private network 104A to event bus 118. The event bus 118 can be a hardware bus or software bus that is configured to receive events published by one or more services, such as hardware virtualization service 116. For example, the event bus may be a shared memory, shared storage, a reliable messaging service, or other hardware or software bus. In some embodiments, the event bus can support an event schema which defines the structure of events that the event bus is configured to process. The event schema may include fields identifying the type of event and the private network with which the event is associated (e.g., using a private network identifier). As shown at numeral 5, when hardware virtualization service 116 receives a request to alter the configuration of private network 104A (e.g., creation, modification, and/or removal of subnets, security groups, routing groups and tables, internet gateways, VPN gateways, load balancers, etc.) an event is generated and sent to event bus 118 as shown at numeral 6.

As discussed, it can be difficult to keep changes in sync across different areas. If changes are made to the master private network 104A and not propagated to the mirror private network 104B, then when failover occurs the mirror private network may not function as expected. Using event bus 118, all configuration change events related to private network 104A generated by hardware virtualization service 116 can be collected and propagated to an instance of mirror management service 110B in the mirror area. As shown at numeral 7, mirror management service 110B can subscribe to the events of private network 104A through event bus 118. As shown in FIG. 1, the first area 102A and second area 102B can be connected via a transit network 122. Transit network 122 may comprise a private backbone network connecting the two areas. As discussed, each area may be geographically distinct, in some embodiments separated by hundreds of miles or more. The transit network can transit traffic between each area. Mirror management service 110B can subscribe to events associated with a particular private network by subscribing to events that include a private network identifier associated with the particular private network. Each instance of mirror management service 110 can include a dependency model 120. As shown, mirror management service 110B can use the dependency model 120 to ensure that the configuration events can be replicated in the correct order in the mirror private network 104B (e.g., the order in which resources need to be created and/or configured to effect the configuration changes received over event bus 118).

Using the dependency model 120, at numeral 8 mirror management service 110B can execute one or more workflows to implement the configuration changes received over the event bus 118 (and optionally checked and/or enhanced via dependency model 120). For example, when a user creates private network 104A with subnet 114A, an event can be generated by hardware virtualization service 116. The event is sent to event bus 118, which passes the event to mirror management service 110B over transit network 122. Dependency model includes one or more actions to be executed prior to creating private network 104B. For example, a lock may be obtained in the second area 102B to ensure no other resources are being created at the same time. Additionally, or alternatively, subsequent changes to an existing private network may need to be performed in an order specified in dependency model 120 (e.g., identify network interfaces associated with a subnet, shutdown the network interfaces before making changes to the subnet, etc.)

In some embodiments, the events generated by configuration changes may be categorized as follows: 1) changes that can be propagated automatically; 2) changes that require user input; and 3) changes that cannot be propagated. In some embodiments, mirror management service 110 and 110 can maintain a data structure identifying various events by category and the mirror management service may perform different actions depending on which type of event is received. Changes that can be propagated automatically may include the addition or removal of resource instances from the master private network. For example, if resource instances such as virtual machines are added or removed from private network 104A, they may be automatically added or removed from private network 104B. Some resources however may require additional customer input. For example, when a subnet is created, it may be configured with a range of IP addresses (e.g., in the form of Classless Inter-Domain Routing (CIDR) block range). The mirror private network also includes a range of IP addresses. Additional user input may be required to map the IP address range of the master private network to the IP address range of the mirror private network. Similarly, port mappings and other security information may also require additional input. For example, some IP addresses may be associated with a load balancer, such configuration may need to be provided manually. Similarly, a domain name service configuration may require customer input to be mirrored. Additionally, in some embodiments, subnet mappings may be maintained to enable customers to manage different subnets of the same size in different private networks.

As shown at numeral 9, when additional user information is required to propagate a given change to private network 104A, a notification may be sent to client device 108 (e.g., through a web interface, console, or other interface). The customer can review the change and provide additional configuration information to implement the change in private network 104B. In some embodiments, if a change that cannot be propagated is detected, mirror management service 110 may take no action in private network 104B and/or mirror management service 110 can send a notification to the client device 108 indicating that a change that cannot be propagated has been detected. In some embodiments, the user may select one or more changes to ignore (e.g., these changes may correspond to expected differences between the two networks). The changes selected by the user to ignore may not be propagated to the mirror private network.

The embodiment shown in FIG. 1 illustrates all of private network 104A being mirrored to private network 104B. In some embodiments, the customer may select a subset of private network 104A to be mirrored to private network 104B. For example, the user may select RI 112A-112C to be mirrored but not RI 112D-112F. This is useful where a customer's private network processes different workloads, which may not all require a backup in a different area. The customer can select which resources are to be mirrored through a console or other interface with mirror management service 110.

Figure 2:
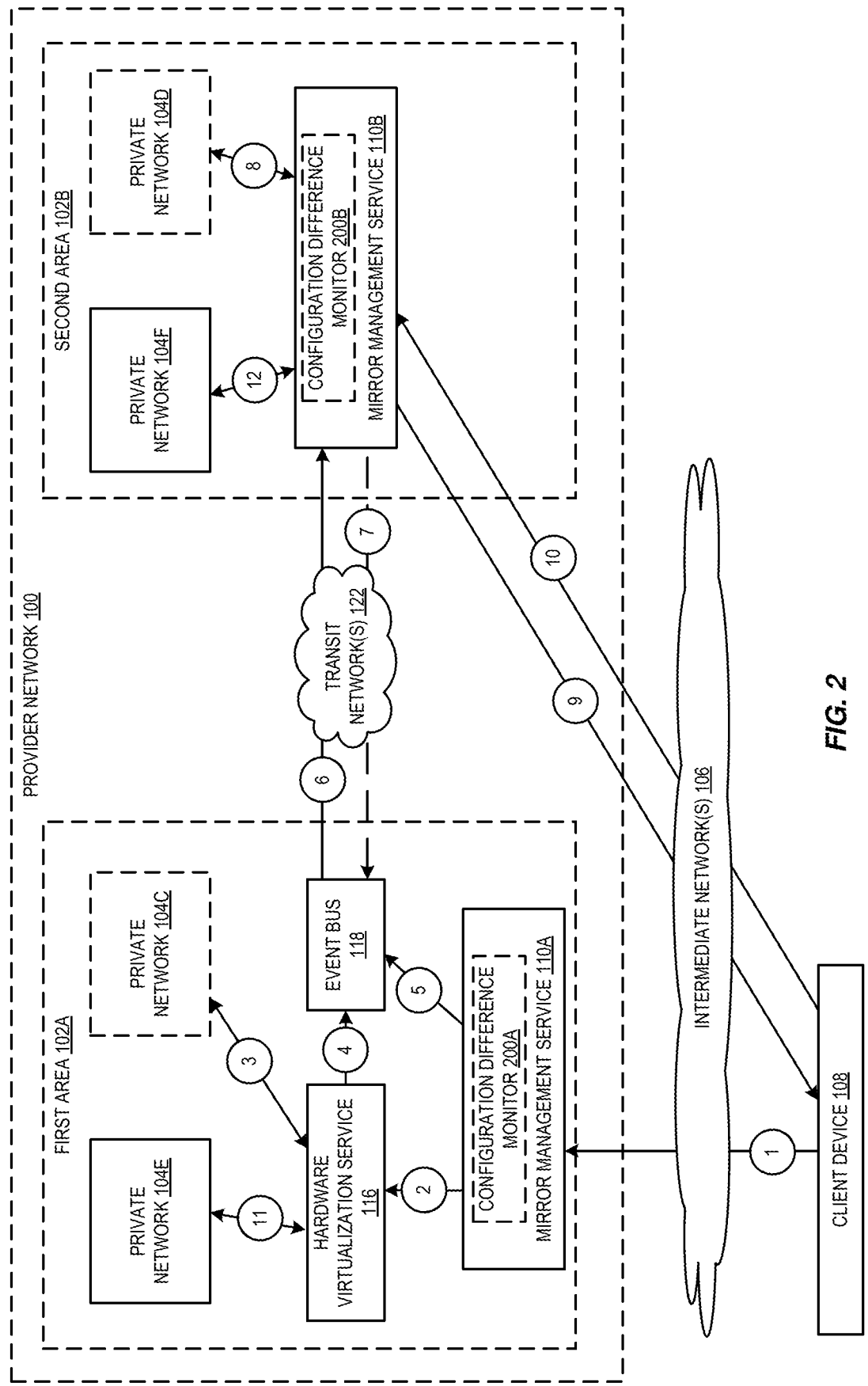
FIG. 2 is a diagram illustrating an environment for private network mirroring according to some embodiments.

FIG. 2 is a diagram illustrating an environment for private network mirroring according to some embodiments. Similar to FIG. 1, as shown at numeral 1 a user can send a request to mirror management service 110A identifying a private network to mirror from the first area 102A to the second area 102B. In some embodiments, the user may create a new private network in first area 102A to be mirrored in second area 102B. For example, hardware virtualization service 116 to create new private network 104C. At numeral 2, mirror management service 110A can instruct hardware virtualization service 116 to send all configuration change events related to private network 104C to event bus 118. At numeral 3, hardware virtualization service 116 creates private network 104C. As the user builds private network 104C, the events generated by hardware virtualization service 116 are sent to event bus 118 at numeral 4.

At numeral 5, configuration difference monitor 200A can generate diff event into the event bus 118. The diff event can include a configuration view of the master private network. The configuration view may be a hierarchical set of dependencies representing the network topology of the master private network, where the root of the hierarchical set of dependencies is the private network. In this example, the master private network may be private network 104C. The target mirror management service 110B can receive the diff event and master private network configuration view over the transit network 122, at numeral 6. Configuration difference monitor 200B can then create a configuration view of the mirror private network 104D and then determine a "diff" including any differences between the two private network topologies by crawling the two configuration views. In some embodiments, at numeral 7 the diff can be returned to mirror management service 110A over transit network 122 using the event bus 118.

For example, private network 104D may be a newly-created private network selected to be the mirror of private network 104C. As private network 104D is newly created, its configuration view may be limited to an initial set of IP addresses, subnets, or other initial configuration information. As events are received from event bus 118, configuration difference monitor 200B can determine that the configuration changes have not been implemented by comparing the events to this initial configuration view. At numeral 8, the configuration changes can be propagated to private network 104D and as the changes are completed, configuration difference monitor 200B can update the configuration view of private network 104D. In some embodiments, configuration changes identified in the diff may be propagated automatically to the mirror private network. In some embodiments, client device 108 can be notified of the configuration changes identified in the diff. For example, at numeral 9 one or more configuration changes identified in the diff can be sent to client device 108. Any changes that require additional information, such as mapping information can be returned at numeral 10. In some embodiment, the user may expect some configuration differences between the master and mirror private networks. The user may send a selection of such changes back to mirror management service 110B to be ignored. These changes may then not be propagated to the mirror private network.

In some embodiments, rather than creating a new private network and mirror, existing private networks may be selected as both the master and mirror private networks. For example, as shown at numeral 1 a user can send a request to mirror management service 110 identifying existing private network 104E to be mirrored by existing private network 104F. At numeral 2, mirror management service 110 can instruct hardware virtualization service 116 to send all configuration change events related to private network 104E to event bus 118. At numeral 11, changes made to private network 104E can be made by hardware virtualization service 116. As changes are made, hardware virtualization service 116 can generate events which are sent to event bus 118 at numeral 4. At numeral 6, mirror management service 110B receives the events generated by changes to private network 104E over transit network 122. Configuration difference monitor 200B can receive or generate a configuration view of both private network 104E and private network 104F. Configuration difference monitor 200 can compare the configuration views of the master and mirror private networks to generate a "diff" which represents the configuration differences between the master and the mirror. The diff may be a list of differences between the master and mirror network topologies, including any infrastructure and/or resource differences as they currently exists in private network 104E and private network 104F. As discussed, the diff can be sent to client device 108 as a report at numeral 9. In some embodiments, the diff can be used by mirror management service 110B to update the configuration of private network 104F automatically and/or based on manual input received from the client device 108 in response to the report at numeral 10. As shown at numeral 12, mirror management service 110 can make configuration changes to private network 104F based on the diff to synchronize the configuration of private networks 104E and 104F.

In some embodiments, a customer can designate a master private network to be mirrored by multiple mirror private networks. For example, a user can designate private network 104C to be mirrored by private network 104D and a private network in a third area (not shown). The changes made to the master private network will then be passed to event bus 118, as discussed above, and multiple instances of mirror management service 110 can receive the events by subscribing to the event bus.

In some embodiments, when a customer creates a new private network, the customer can select a master private network that already exists to be mirrored by the new private network. For example, in the example of FIG. 2, a customer creates private network 104C and then creates 104D to be the mirror. Alternatively, the customer can create new private network 104D and then select a new or existing private network (e.g., private network 104C or 104E) to be the master private network of new private network 104D.

Figure 3:
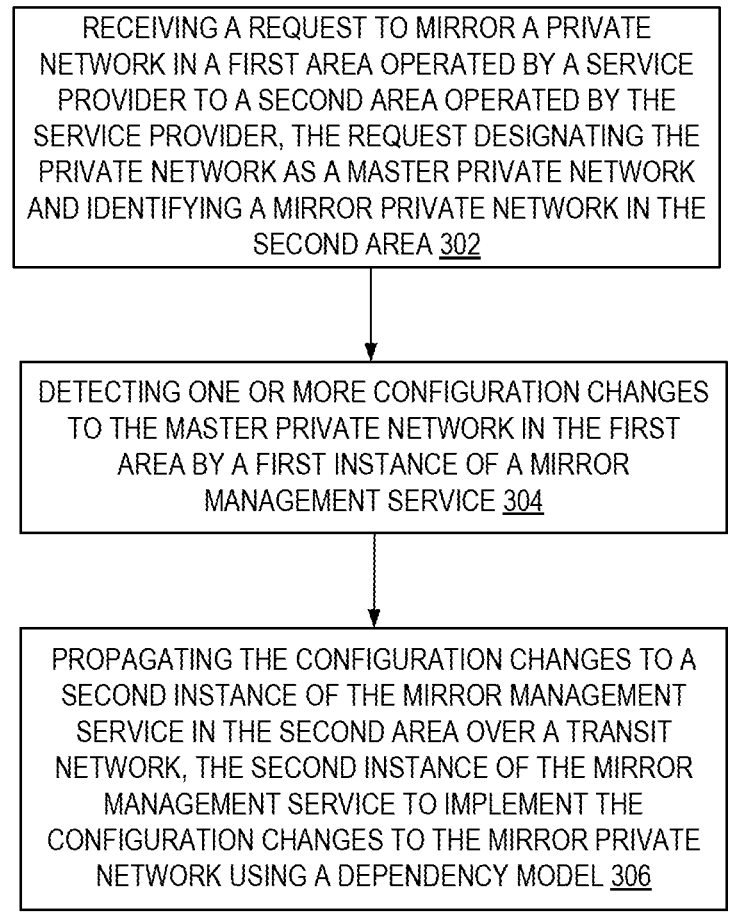
FIG. 3 is a flow diagram illustrating operations of a method for private network mirroring according to some embodiments.

FIG. 3 is a flow diagram illustrating operations 300 of a method for private network mirroring according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by mirror management service 110 of the other figures.

The operations 300 include, at block 302, receiving a request to mirror a private network in a first area operated by a service provider to a second area operated by the service provider, the request designating the private network as a master private network and identifying a mirror private network in the second area. In some embodiments, the first area is logically isolated from the second area, such that a failure in the first area is isolated from the second area. As discussed, the master private network and mirror private network can be located in different areas. The areas may be logically and or geographically isolated from one another. As referred to herein, geographically isolated areas may be referred to as regions and each region may include multiple logically isolated areas. In some embodiments, the request includes a plurality of mirror private networks in a plurality of areas and wherein the configuration changes are propagated to each of the plurality of mirror private networks.

The operations 300 include, at block 304, detecting one or more configuration changes to the master private network in the first area by a first instance of a mirror management service. Configuration changes can be monitored by receiving events generated by a hardware virtualization service, or other service, which generates events associated with the master private network when changes are made to the master private network. In some embodiments, the events may identify a type of change made to the private network. In some embodiments, the configuration changes include one or more of creation of a private network, addition of resource instances to the private network, removal of resource instances from the private network.

The operations 300 include, at block 306, propagating the one or more configuration changes to a second instance of the mirror management service in the second area over a transit network, the second instance of the mirror management service to implement the configuration changes to the mirror private network using a dependency model. In some embodiments, propagating the configuration changes to the mirror private network can include generating an event when a configuration change is made to the master private network in the first area, and publishing the event to an event bus. In some embodiments, events associated with the master private network can be subscribed to with the event bus. A first hierarchical set of dependencies corresponding to the master private network can be determined. A second hierarchical set of dependencies corresponding to the mirror private network can be determined. One or more configuration differences between the master private network and the mirror private network can be determined by comparing the first hierarchical set of dependencies and the second hierarchical set of dependencies. The configuration of the mirror private network can be modified based on the one or more configuration differences. In some embodiments, a dependency model can be used to determine an order in which to apply one or more configuration changes to the mirror private network based on the dependency model.

In some embodiments, it may be determined that at least one configuration change requires additional information to be propagated. A request can be sent to a client device for the additional information. The additional information can be received from the client device, and the at least one configuration change can be propagated using the additional information. In some embodiments, the additional information includes an IP address mapping, a subnet mapping, or a port mapping from the first area to the second area.

In some embodiments, a request to create the master private network can be received. The request including a first area and a plurality of resource instances to include in the master private network. The master private network can be created in the first area and the plurality of resource instances can be provisioned. In response to the request to mirror the master private network, the mirror private network can be created in the second area and provisioning a second plurality of resource instances in the second area.

In some embodiments, private network mirroring may include receiving a request to create a private network, the request including a first area and a plurality of resource instances to include in the private network, the plurality of resource instances including one or more of virtual machine instances and storage instances. Private network mirroring may further include creating the private network in the first area and provisioning the plurality of resources resource instances and receiving a request to mirror the private network in a second area, the request designating the private network as a master private network and identifying a mirror private network in the second area. Configuration changes to the master private network in the first area can be monitored, and the configuration changes can be propagated to the mirror private network in the second area using an event bus. The events associated with the master private network can be subscribed to from the event bus, and the configuration changes corresponding to the events received from the event bus can be implemented in the mirror private network using a dependency model, the dependency model determining an order in which to implement the configuration changes.

In some embodiments, a first configuration change corresponding to a first event received from the event bus can be determined to require mapping information to be implemented. The mapping information can correspond to at least one of a subnet mapping, port mapping, or IP address mapping. A request can be sent to a client device for the mapping information. The mapping information can be received from the client device and used to implement the first configuration change using the mapping information.

In some embodiments, a notification can be sent to a client device, the notification indicating the one or more configuration changes. A selection of at least one configuration change to ignore can be received. A subset of the one or more configuration changes can then be propagated, the subset not including the at least one configuration change to ignore.

In some embodiments, a request to create a private network can be received. The request identifying a first logical data center operated by a service provider and a plurality of resource instances to include in the private network, the plurality of resource instances including one or more of virtual machine instances and storage instances. The private network can be created in the first logical data center and provisioning the plurality of resource instances. A request can be received to mirror the private network in a second logical data center operated by the service provider, the request designating the private network as a master private network and identifying a mirror private network in the second area, the first logical data center and second logical data center connected via a private backbone network. Configuration changes to a network topology of the master private network can be monitored by a first instance of a mirror management service in the first logical data center. The configuration changes can be propagated over the private backbone network from the first instance of the mirror management service in the first logical data center to a second instance of the mirror management service in the second logical data center. The configuration changes corresponding to the events received over the private backbone network can be implemented by the second instance of the mirror management service to the mirror private network using a dependency model, the dependency model determining an order in which to implement the configuration changes.

Various embodiments of methods, apparatus, systems, and non-transitory computer-readable storage media for failover management using availability groups are described. According to some embodiments, customers can define one or more availability groups within their infrastructure. Each availability group may be associated with one or more rules which describe how the availability group should fail over. The availability group definition may define the resources included in the availability group, a target region to failover to, and the type or types of resources to be used to backup the availability group in the target region. In some embodiments, the definition may also include a replication frequency for storage resources which defines how often data is backed up. Once a customer has created an availability group, the customer is then able to either create resources in that availability group or associate already-existing resources with the availability group. An availability group management service can ensure that data, resource capacity, and network infrastructure are defined and/or replicated to the target location. If the target location becomes out of sync with the source location defined in the availability group in a way that prevents automated corrective action, an event can be generated to notify the customer of the issue and to suggest corrective action.

Figure 4:
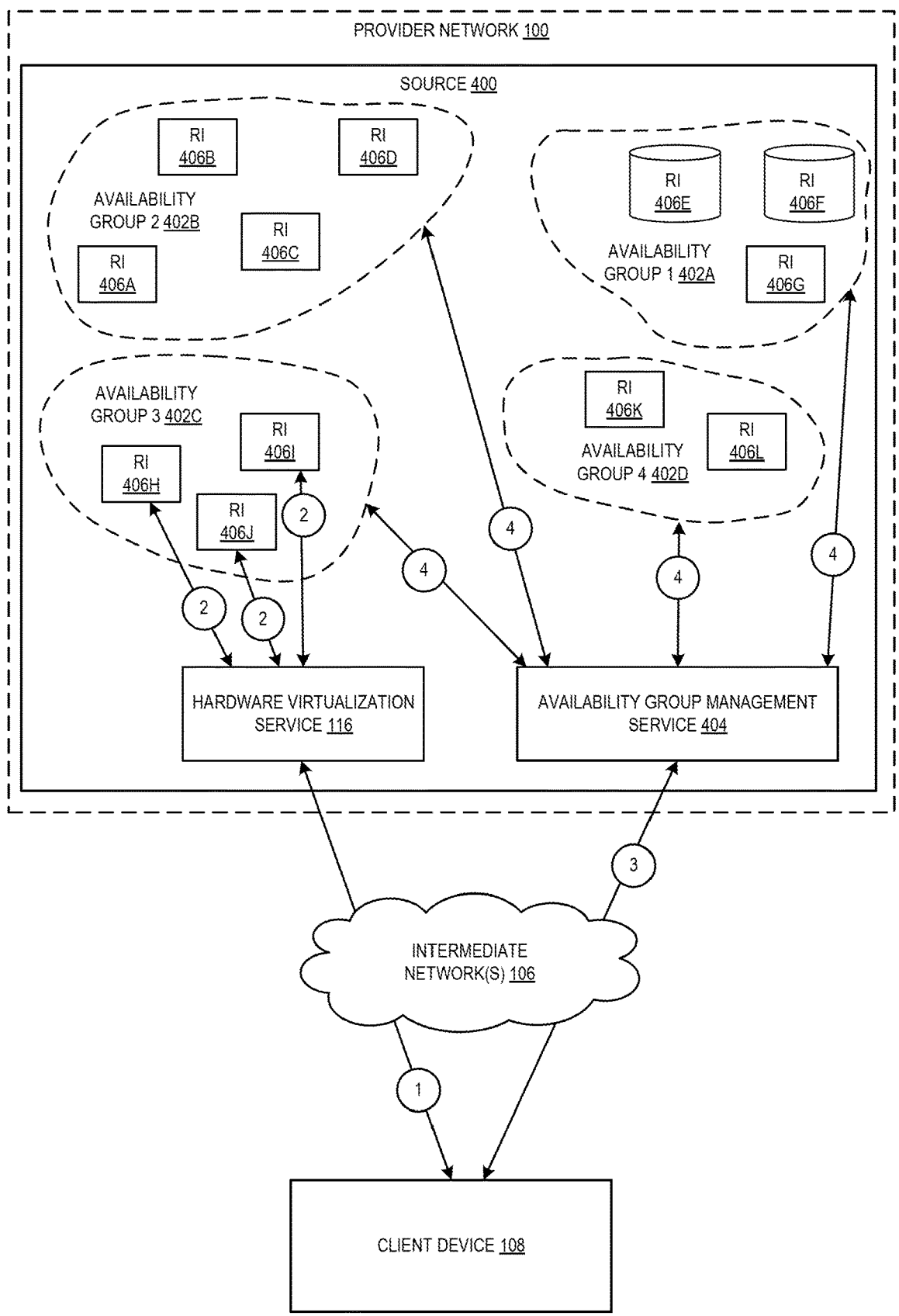
FIG. 4 is a diagram illustrating an environment for availability group management according to some embodiments.

FIG. 4 is a diagram illustrating an environment for availability group management according to some embodiments. As discussed above, a customer may configure their infrastructure to be backed up in another area in the event of failure. As shown in FIG. 4, at numeral 1, a client device can send a request to a hardware virtualization service to set up the customer's infrastructure in a source environment 400 in provider network 100. At numeral 2, hardware virtualization service 116 can set up the requested infrastructure (e.g., deploy virtual machines and/or storage instances to source environment 400). Although at numeral 2, the resources associated with availability group 3 are shown, at this step all or some of the resources associated with each availability group may be deployed. However, a customer may not want to failover all of their infrastructure at once. For example, critical services may need to be failed over, while non-critical services may be failed over, partially failed over, or not failed over at all. In accordance with an embodiment, one or more availability groups may be defined within a customer's infrastructure. Each availability group may define a different portion of the customer's infrastructure. Each availability group may be associated with one or more failover rules which may be used to prioritize failover of the customer's infrastructure.

In some embodiments, availability groups enable customers to identify, group, and describe failover rules for resources. At numeral 3, client device 108 can send a request to availability group management service 404 to define one or more availability groups in the source environment. The request may include an availability group definition. For example, as shown in FIG. 4, availability group 1 may be defined to include storage resource instances 406E and 406F, and may include other resources such as resource instance 406G. Availability group 1 402A may represent a data tier of an application developed by the customer. Availability groups 402B-402D may represent other tiers of the customer's application or other applications developed and/or supported by the customer. Each availability group may be associated with one or more rules which describe how the infrastructure associated with the availability group. The rules may define a failover target (e.g., region or area to which to failover), and a backup type (e.g., add on demand resources to the target, identify reserved resources in the target, etc.) for each resource in the availability group. In some embodiments, storage resources may also be associated with a rule that defines snapshot frequency, for how often data is to be backed up to the backup resource. At numeral 4, using the availability group definitions, the availability group management service 404 can identify the resources associated with each availability group.

FIG. 5 is an example of availability group definitions 500 according to some embodiments. As shown in FIG. 5, the availability group definitions 500 can include one or more availability groups 502A and 502B. Each availability group may be defined using one or more tags 504A, 504B. Tags may be associated with each resource as it is created by hardware virtualization service 116. Each resource instance associated with the tags defined in the availability group definition is then included in the availability group. In some embodiments, the availability groups may be defined using instance identifiers 506A, 506B associated with each resource instance, such as resource instance name, IP address, etc.

In some embodiments, customer can define a dynamic filter 508A, 508B for an availability group. If the customer has an existing infrastructure with a large number of resource instances, the dynamic filter can be used to identify which resource instances belong to which availability groups, without requiring the customer to individually identify each resource instance for each group. Each availability group can include dynamic filter criteria for use in identifying the resources. For example, the filter criteria may include tags or account information to be used to identify the resource instances (e.g., any resource instances owned by account A and associated with tag B should be added to availability group 1, etc.). Additionally, or alternatively, the dynamic filter criteria can include hardware or resource characteristics (e.g., instance type, hardware type, etc.). As resources are created, the dynamic filter criteria can be used to scan and find the ones that match the criteria. If a resource is identified as being associated with more than one availability group, a message can be sent to the customer identifying the resource and the identified availability group. In some embodiments, the customer can send a response to the message selecting one of the availability groups to assign the resource to.

In some embodiments, each availability group definition may include a criticality value 509A, 509B. The criticality value may be a binary value indicating whether the availability group is considered critical or not by the user. In some embodiments, the criticality value may be a numerical value representing the criticality of the availability group relative to other availability groups (e.g., a criticality ranking). For critical availability groups, a notification field 511A, 511B may be included. The notification field may include an identifier associated with one or more entities to notify if the availability group does not successfully failover. The identifier may be an account identifier, an IP address, or other identifier associated with an entity to be notified. For example, if an attempted failover of an availability group is unsuccessful, the notification instructions can specify whether a notification is sent to the customer and whether the failover continues, whether the failover for the availability group is attempted again, etc.

In some embodiments, the availability group definitions 500 may also include backup parameters 510. The backup parameters may be specified separately for each availability group or may be applied to all availability groups in the availability groups definitions 500. The backup parameters may include a source 512 identifier and a target 514 identifier. The source and target identifiers may each include an area identifier associated with the source area and the target area. A replication frequency 516 may be included in the backup parameters. The replication frequency may include continuous or periodic replication. If periodic replication is specified, the period of time may be included in the backup parameters. In some embodiments, the replication frequency may be applied to all storage instances included in each availability group or may be defined for specific storage instances. In those embodiments where the replication frequency is specified for particular storage instances, a storage instance identifier (e.g., name, IP address, etc.) may be associated with the replication frequency. The backup parameters may also include a backup type 518, which may specify whether the availability group is to be failed over to reserved resources, on demand resources, etc. In some embodiments, the backup parameters can also include a failover sequence 520. The failover sequence can include a sequential list of availability groups representing a dependency between availability groups. For example, an availability group representing a user's database tier may need to be failed over before the availability groups representing the user's web or application tiers. During failover, the availability groups can be failed over in the order defined in failover sequence 520.

Figure 6:
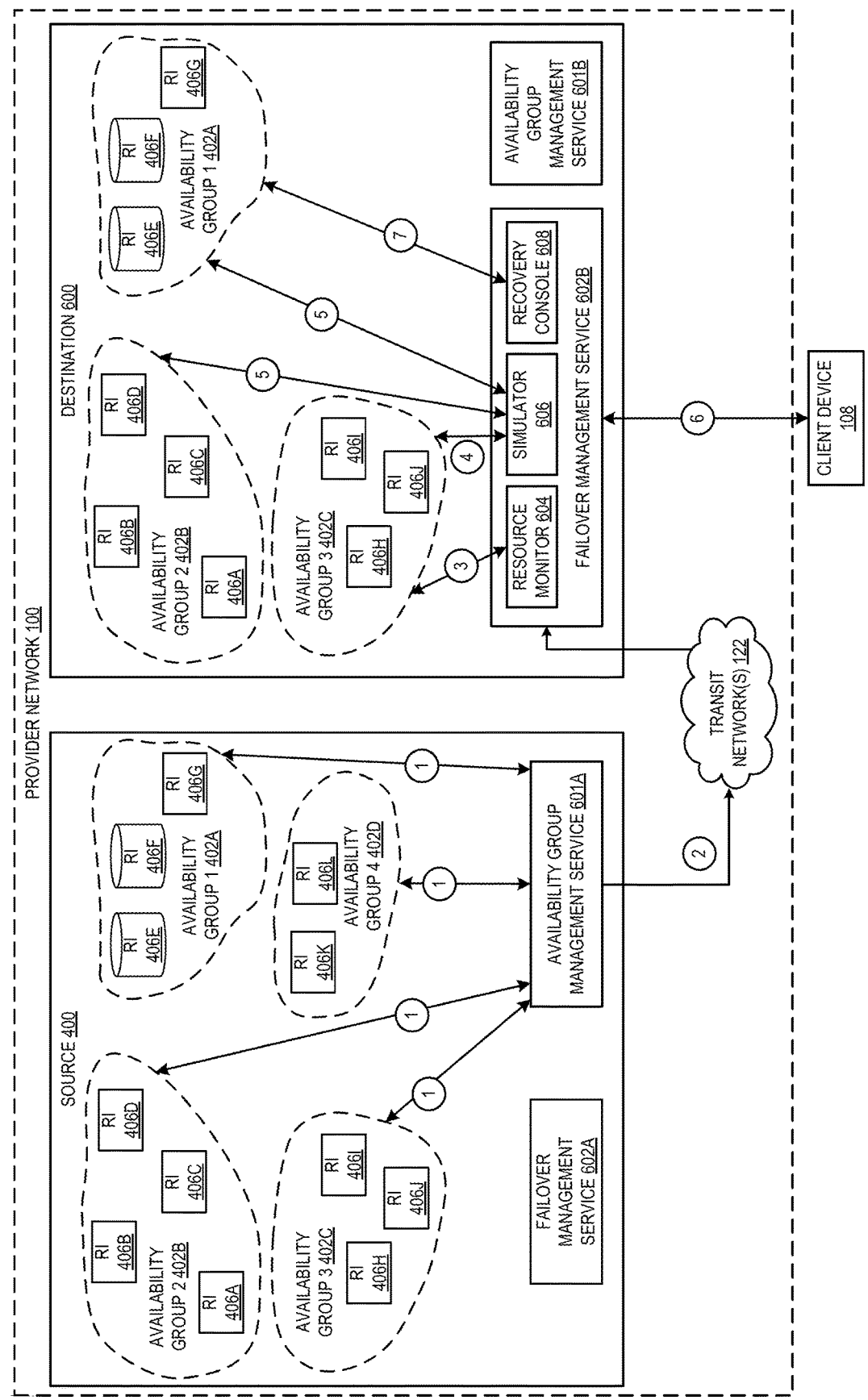
FIG. 6 is a diagram illustrating an environment for failover management using availability groups according to some embodiments.

FIG. 6 is a diagram illustrating an environment for failover management using availability groups according to some embodiments. As discussed above, at numeral 1, using the availability group definitions, the availability group management service 601A can identify the resources associated with each availability group. At numeral 2, a failover management service 602B can receive the availability group definitions and/or identifiers associated with each resource in each availability group from availability group management service 601A over a transit network 122. Failover management service 602B can monitor destination 600 to ensure there are available resources to backup the availability groups in the destination, can ensure backed up resources are up to date in the destination, and can perform simulated failover of the availability groups. The available resources may include resource instances, such as virtual machine instances, as well as available storage volumes or other resources associated with the resource instances.

At numeral 3, resource monitor 604 can ensure that data, resource capacity and network infrastructure are defined and/or replicated to the destination 600. The resource capacity may include reserved resources in the destination and/or available on demand resources in the destination. For example, some availability groups may be replicated to reserved instances in destination 600. Availability group 1 402A may include a storage tier including one or more storage instances. The data in availability group 1 in source 400 may be continually or periodically replicated (based on availability group definitions 500) to the reserved instances in destination 600. In the event that resource monitor 604 determines that destination 600 has insufficient capacity to support failover of one or more of the availability groups, at numeral 6 the resource monitor can send a notification to the client device. The resource monitor can receive a response from the client device which may change the availability group definitions such that that destination has sufficient resources and/or request that additional resource instances be added to the destination. In some embodiments, the response from the client device may identify a new destination for all or a portion of the availability groups which has sufficient resources to support failover of the one or more availability groups.

In some embodiments, resource monitor 604 can include a configuration difference monitor 200 to compare data and/or configuration views of the source availability groups and the destination to generate a "diff" which represents the data and/or configuration differences between the source 400 and the destination 600. Using the diff, the resource monitor can determine if the destination no longer has capacity for the source availability group and, at numeral 6, can notify the customer. In some embodiments, resource monitor 604 can also track how up to date the resources replicated in the destination 600 are with the corresponding resources in source 400. For example, each time data is replicated successfully to resources in destination 600, a quiesce point can be recorded (e.g., if data is periodically replicated, at the end of each periodic replication the date and time can be recorded as a quiesce point). In the event of failover, the most recent quiesce point may provide the customer with a fixed point in time from which the recovered services may continue operating, and any transactions performed after the quiesce point may be performed again. In the event that the destination 600 becomes out of sync with the source 400 defined in the availability group an event can be generated by resource monitor 604 and sent to client device 108 at numeral 6 can send a message to the client device 108 to notify the customer of the issue and to suggest corrective action. For example, the source and destination can be rolled back to the latest quiesce point.

In some embodiments, at numeral 4, simulator 606 can use the availability group definitions to perform simulated failover. The customer can select an availability group to perform simulated failover. In the example shown in FIG. 6, availability group 3 402C has been selected to perform simulated failover. Simulator 600 can request resource instances 406H-406J be created in destination 600, and data and configuration information can be migrated to these instances from the corresponding instances in source 400. The customer can then validate that the resource instances are restored to a running state in destination 600 (e.g., one or more validation tests may be performed to ensure the resource instances in destination 600 are performing as expected). In some embodiments, prior to simulated failover of the selected availability group, simulator 606 can identify any other availability groups that are defined to be failed over prior to the selected availability group. For example, at numeral 5, the simulator can identify availability groups 1 and 2 402A, 402B as being defined to be failed over prior to the selected availability group 3 402C, based on the availability group definitions 500. Simulator 606 can perform simulated failover of the availability groups sequentially based on the availability group definitions 500 until failover of the selected availability group has been simulated. The simulated failover can then be validated.

During simulated failover, the resource instances in the source 400 may continue to run, using live data as though they had not been failed over. As such, any changes to the resource instances in destination 600 do not have to be tracked and used to later restore the resource instances to source 400. Once the customer has completed the simulation, simulator 606 can deprovision the resource instances that were provisioned for the simulation. In some embodiments, if an actual failure in source 400 occurs during a simulated failover, the failover can be committed as being a real failover and the provisioned resource instances can be operating in place of the source resources.

In some embodiments, at numeral 7, recovery console 608 can be used to initiate a failover for an availability group. Recovery console 608 can provision the resource instances in each availability group to the destination, with each resource instance restored to the most recent quiesce point. The failover can be performed according to the availability group definitions. In the example of FIG. 6, if availability group 1 is already replicated in the destination 600, the availability group definitions can then failover availability group 2. If the failover is unsuccessful, the notification settings for the availability group can determine whether failover continues or whether failover is paused while the customer is notified. As such, the availability group definitions act as a customer defined workflow for migrating their infrastructure. Once complete and confirmed by the customer the recovery console can instruct resource monitor 604 to monitor the failed over availability groups to continue creating quiesce points. This will allow the availability groups to be restored to the source 400 once the failure event has been resolved. In some embodiments, recovery console 608 can perform fail back once the failure event is resolved. In some embodiments, an instance of availability group management service 601B in destination 600 can manage changes to availability group definitions received after failover and can coordinate fail back processing with failover management service 602A in source 400.

Figure 7:
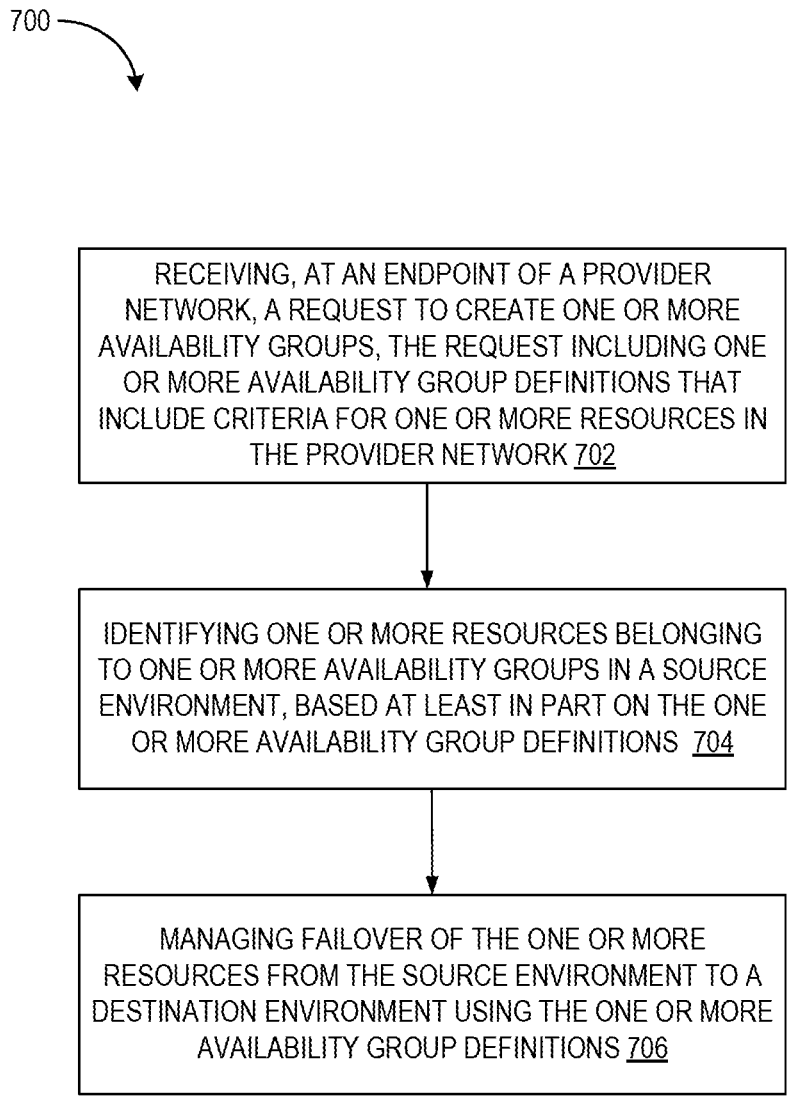
FIG. 7 is a flow diagram illustrating operations of a method for managing availability groups according to some embodiments.

FIG. 7 is a flow diagram illustrating operations 700 of a method for managing availability groups according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the availability group management service 404 or failover management service 602 of the other figures.

The operations 700 include, at block 702, receiving, from a client device, a request to create one or more availability groups, the request including one or more availability group definitions. In some embodiments, the availability group definitions can include a source environment identifier, a destination environment identifier, and at least one of a tag, resource identifier, or dynamic filter criteria that identify resources as belonging to the one or more availability groups.

The operations 700 include, at block 704, identifying one or more availability groups in a source environment, each of the one or more availability groups including one or more resources. In some embodiments, identifying the one or more availability groups can include determining the one or more resources belonging to the one or more availability groups in the source environment using the dynamic filter criteria. This may include analyzing a plurality of resources in the source environment to identify a subset of resources associated with the one or more availability groups using the one or more availability group definitions;

The operations 700 include, at block 706, managing failover from the source environment to a destination environment using the one or more availability group definitions. In some embodiments, managing failover can include performing failover of the one or more availability groups in a sequence defined by the one or more availability group definitions. If failover of an availability group is unsuccessful, failover can be paused and a notification can be sent to the client device. In some embodiments, managing failover can include monitoring resource capacity in the destination. The resource capacity including reserved resources and available on demand resources. If the resource capacity determined to be insufficient to receive the failover of the one or more availability groups, then a notification can be sent to the client device.

In some embodiments, managing failover can include replicating data from the one or more availability groups to the destination periodically, based on the one or more availability group definitions. Each time data replication is successful, a quiesce point can be recorded. The quiesce point can establish a last point in time when the source and destination were synchronized. In some embodiments, managing failover can include receiving a request to perform simulated failover, the request identifying a first availability group. Failover can then be simulated for the resources associated with the first availability group in the destination. Simulated failover can include determining a failover sequence associated with the one or more availability groups. Based on the failover sequence a second availability group to be failed over prior to the first availability group can be identified, and simulated failover of the second availability group can be performed prior to performing simulated failover of the first availability group. Once simulated failover has been performed, the one or more resources in the destination environment can be validated. In some embodiments, during simulated failover a failure event in the source environment can be detected. The simulated failover can then be committed to convert the simulated failover into an actual failover.

Figure 8:
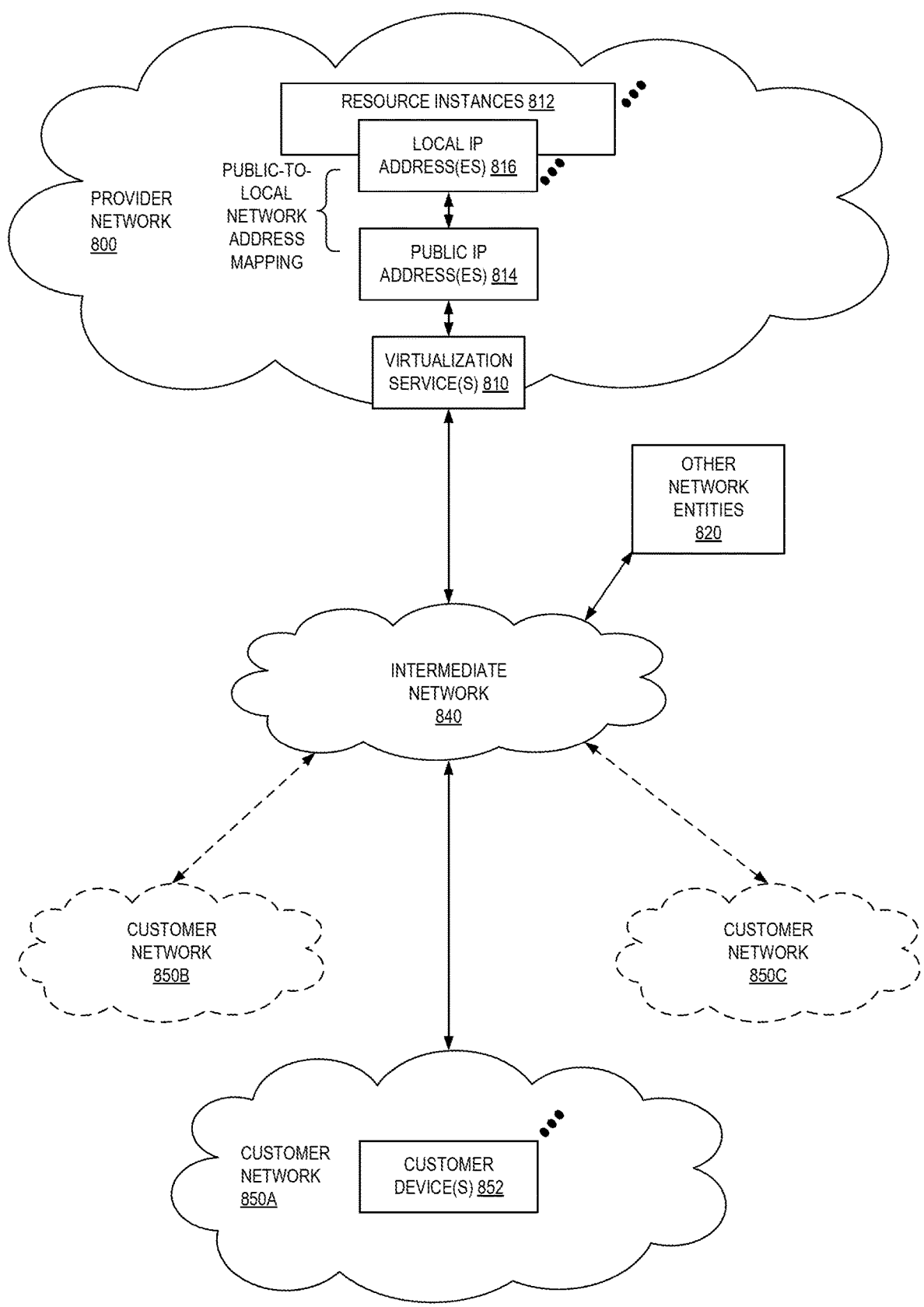
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local IP addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
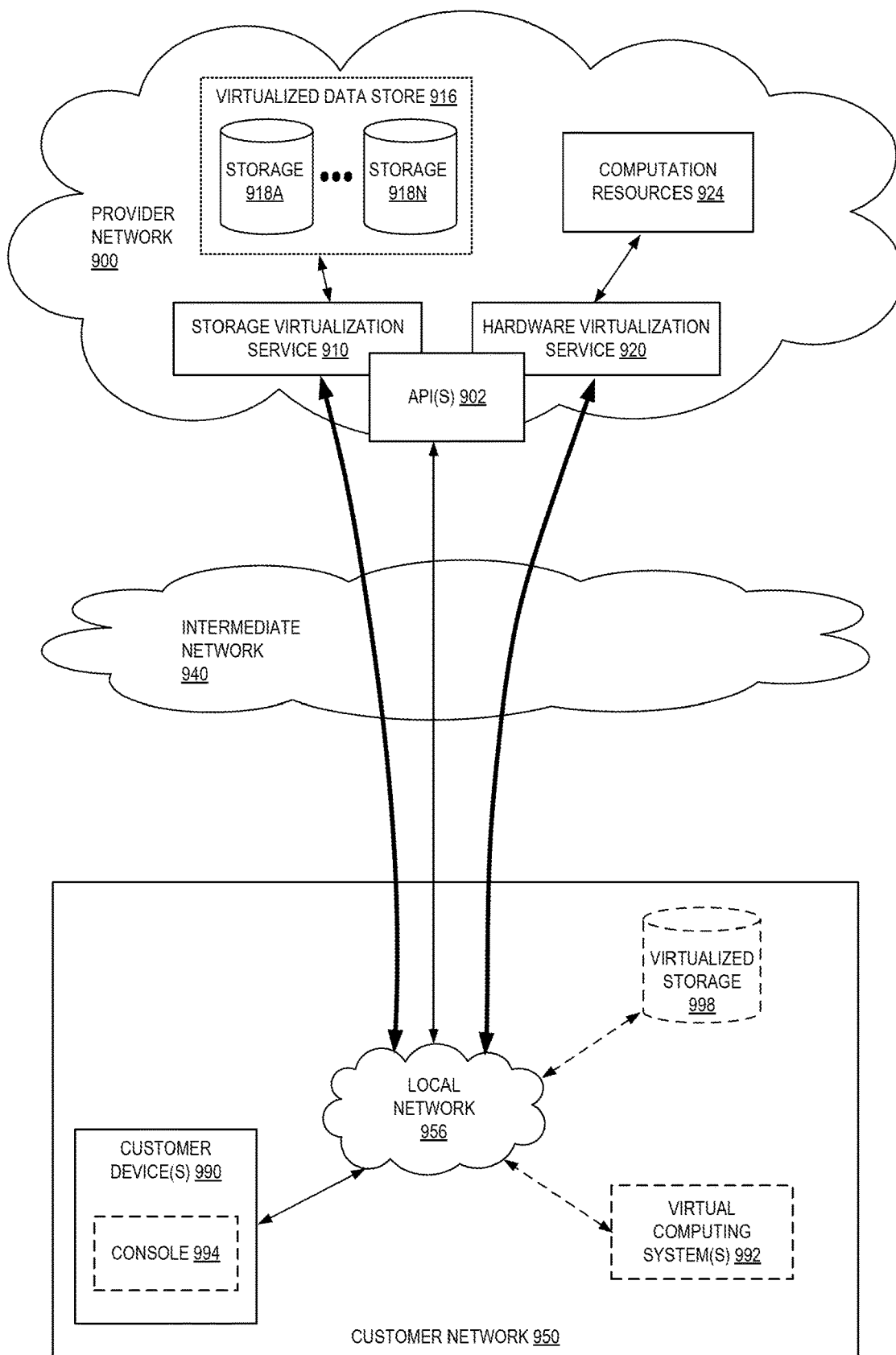
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
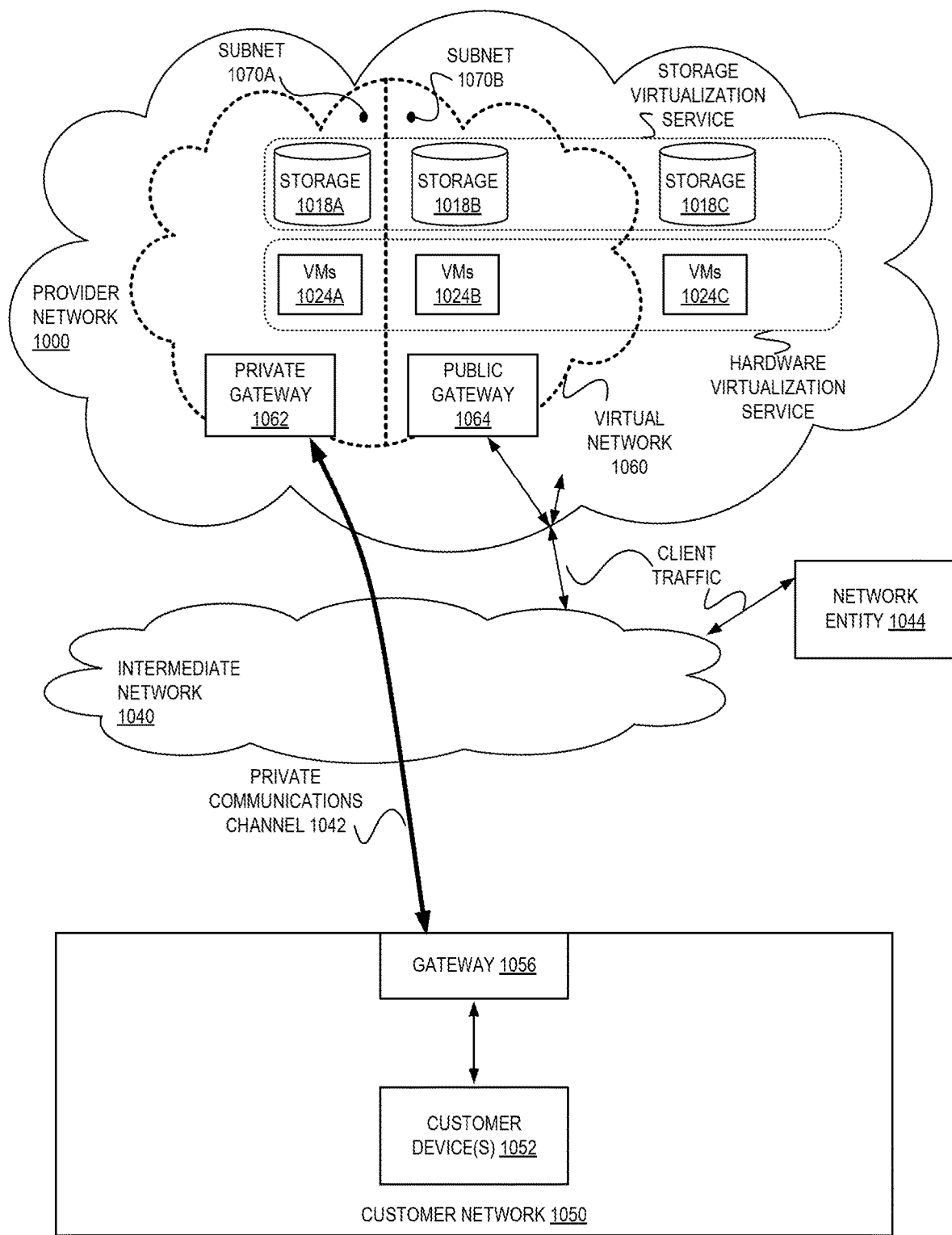
FIG. 10 illustrates an example provider network that provides virtual networks on the provider network to at least some customers according to some embodiments.

FIG. 10 illustrates an example provider network that provides virtual networks on the provider network to at least some customers, according to some embodiments. A customer's virtual network 1060 on a provider network 1000, for example, enables a customer to connect their existing infrastructure (e.g., one or more customer devices 1052) on customer network 1050 to a set of logically isolated resource instances (e.g., VMs 1024A and 1024B and storage 1018A and 1018B), and to extend management capabilities such as security services, firewalls, and intrusion detection systems to include their resource instances.

A customer's virtual network 1060 may be connected to a customer network 1050 via a private communications channel 1042. A private communications channel 1042 may, for example, be a tunnel implemented according to a network tunneling technology or some other technology over an intermediate network 1040. The intermediate network may, for example, be a shared network or a public network such as the Internet. Alternatively, a private communications channel 1042 may be implemented over a direct, dedicated connection between virtual network 1060 and customer network 1050.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1060 for a customer on provider network 1000, one or more resource instances (e.g., VMs 1024A and 1024B and storage 1018A and 1018B) may be allocated to the virtual network 1060. Note that other resource instances (e.g., storage 1018C and VMs 1024C) may remain available on the provider network 1000 for other customer usage. A range of public IP addresses may also be allocated to the virtual network 1060. In addition, one or more networking nodes (e.g., routers, switches, etc.) of the provider network 1000 may be allocated to the virtual network 1060. A private communications channel 1042 may be established between a private gateway 1062 at virtual network 1060 and a gateway 1056 at customer network 1050.

In some embodiments, in addition to, or instead of, a private gateway 1062, virtual network 1060 may include a public gateway 1064 that enables resources within virtual network 1060 to communicate directly with entities (e.g., network entity 1044) via intermediate network 1040, and vice versa, instead of or in addition to via private communications channel 1042.

Virtual network 1060 may be, but is not necessarily, subdivided into two or more subnetworks, or subnets, 1070. For example, in implementations that include both a private gateway 1062 and a public gateway 1064, a virtual network 1060 may be subdivided into a subnet 1070A that includes resources (VMs 1024A and storage 1018A, in this example) reachable through private gateway 1062, and a subnet 1070B that includes resources (VMs 1024B and storage 1018B, in this example) reachable through public gateway 1064.

The customer may assign particular customer public IP addresses to particular resource instances in virtual network 1060. A network entity 1044 on intermediate network 1040 may then send traffic to a public IP address published by the customer; the traffic is routed, by the provider network 1000, to the associated resource instance. Return traffic from the resource instance is routed, by the provider network 1000, back to the network entity 1044 over intermediate network 1040. Note that routing traffic between a resource instance and a network entity 1044 may require network address translation to translate between the public IP address and the local IP address of the resource instance.

Some embodiments may allow a customer to remap public IP addresses in a customer's virtual network 1060 as illustrated in FIG. 10 to devices on the customer's external network 1050. When a packet is received (e.g., from network entity 1044), the network 1000 may determine that the destination IP address indicated by the packet has been remapped to an endpoint on external network 1050 and handle routing of the packet to the respective endpoint, either via private communications channel 1042 or via the intermediate network 1040. Response traffic may be routed from the endpoint to the network entity 1044 through the provider network 1000, or alternatively may be directly routed to the network entity 1044 by the customer network 1050. From the perspective of the network entity 1044, it appears as if the network entity 1044 is communicating with the public IP address of the customer on the provider network 1000. However, the network entity 1044 has actually communicated with the endpoint on customer network 1050.

While FIG. 10 shows network entity 1044 on intermediate network 1040 and external to provider network 1000, a network entity may be an entity on provider network 1000. For example, one of the resource instances provided by provider network 1000 may be a network entity that sends traffic to a public IP address published by the customer.

Figure 11:
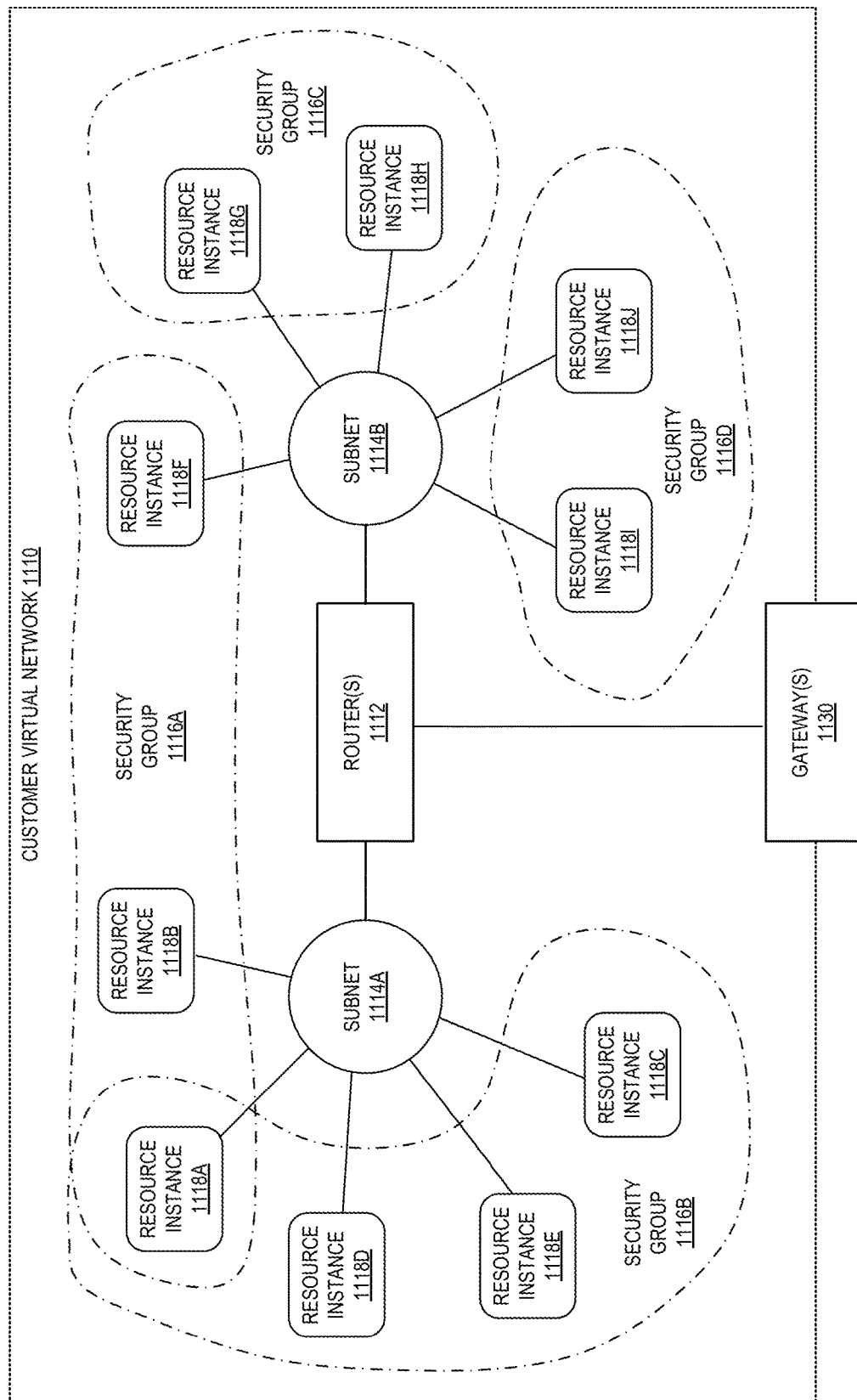
FIG. 11 illustrates subnets and security groups in an example virtual network on a provider network according to some embodiments.

FIG. 11 illustrates subnets and security groups in an example virtual network 1110 on a provider network, according to some embodiments. In some embodiments, a provider network such as provider network 1000 in FIG. 10 may allow the customer to establish and manage virtual security groups 1116 (e.g., 1116A-1116D) within the customer's virtual network 1110, within or across subnets 1114. A security group 1116 is a logical grouping of resource instances 1118 and acts as a virtual firewall that controls the traffic allowed to reach one or more resource instances 1118 within the security group 1116 according to security group rules. The customer may establish one or more security groups 1116 within the virtual network 1110, and may associate each resource instance 1118 in the virtual network 1110 with one or more of the security groups 1116. In some embodiments, the customer may establish and/or modify rules for each security group 1116 that control the inbound traffic allowed to reach the resource instances 1118 associated with the security group 1116.

In the example virtual network 1110 shown in FIG. 11, the virtual network 1110 is subdivided into two subnets 1114A and 1114B. Access to the virtual network 1110 is controlled by gateway(s) 1130. Each subnet 1114 may include at least one router 1112 that acts to route traffic to (and from) resource instances 1118 on the respective subnet 1114. In some embodiments, network access control lists (ACLs) may be used to control access to the subnets 1114 at router(s) 1112. In the example shown in FIG. 11, resource instances 1118A through 1118E are on subnet 1114A, and resource instances 1118F through 1118J are on subnet 1114B. The customer has established four security groups 1116A through 1116D. As shown in FIG. 11, a security group may extend across subnets 1114, as does security group 1116A that includes resource instances 1118A and 1118B on subnet 1114A and resource instance 1118F on subnet 1114B. In addition, a resource instance 1118 may be included in two or more security groups 1116, as is resource instance 1118A which is included in security group 1116A and 1116B.

Illustrative System

Figure 12:
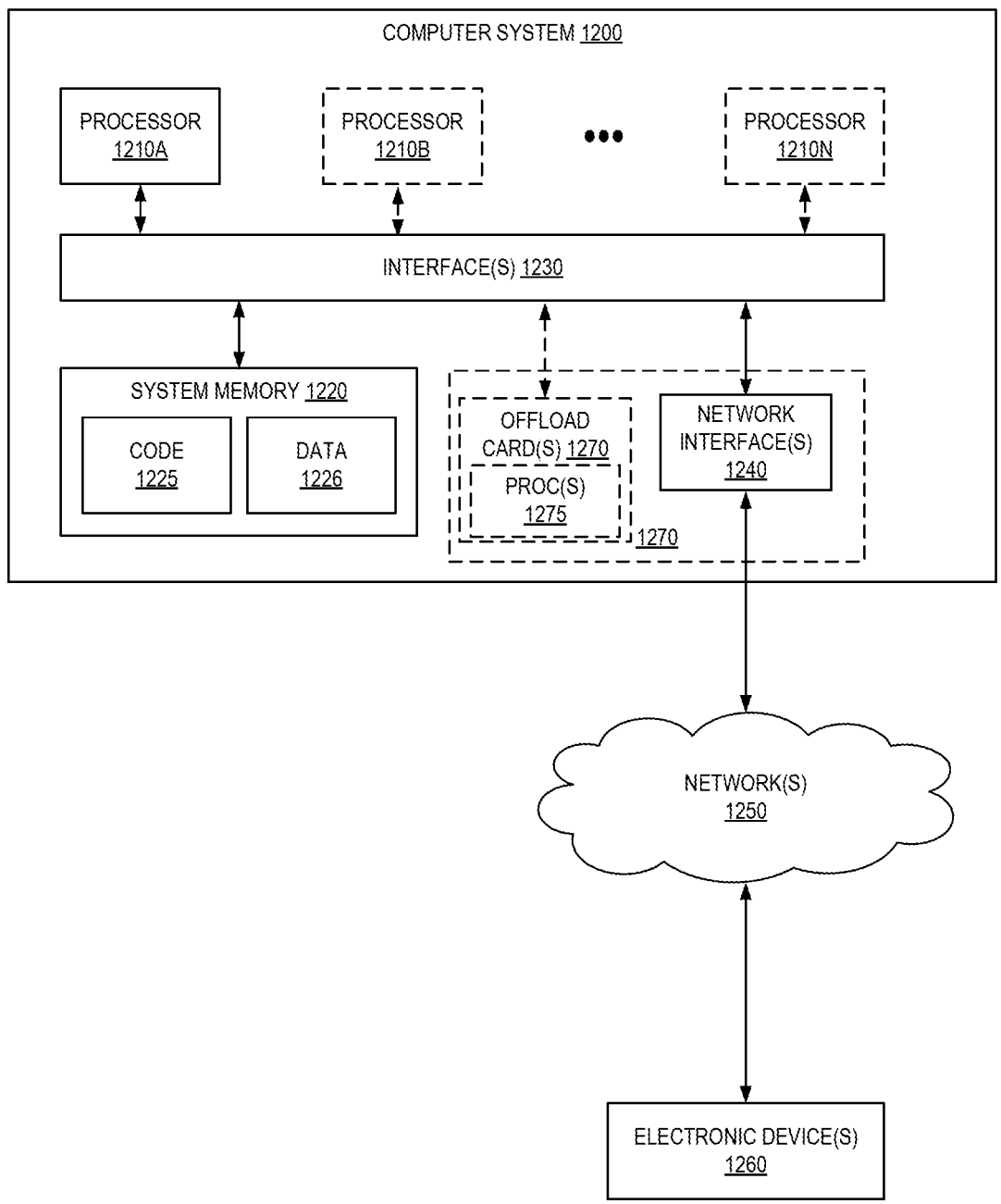
FIG. 12 is a block diagram illustrating an example computer system that may be used in some embodiments.

In some embodiments, a system that implements a portion or all of the techniques for failover management using availability groups as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102B, 104A-104B, 112A-112L, 402A-402D, 406A-406L, 502A-502B, 504A-504B, 506A-506B, 508A-508B, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to create a private network, the request identifying a first logical data center operated by a service provider and a plurality of resource instances to include in the private network, the plurality of resource instances including one or more of virtual machine instances;
   creating the private network in the first logical data center and provisioning the plurality of resource instances;
   receiving a request to mirror the private network in a second logical data center operated by a service provider, the request designating the private network as a master private network and identifying a mirror private network in the second logical data center, the first logical data center and second logical data center connected via a private backbone network;
   monitoring configuration changes to a network topology of to the master private network by a first instance of a mirror management service in the first logical data center;
   generating one or more events corresponding to the one or more configuration changes to the master private network;
   publishing the one or more events to an event bus to propagate the configuration changes over the private backbone network from the first instance of the mirror management service in the first logical data center to a second instance of the mirror management service in the second logical data center;
   determining, by the second instance of the mirror management service, one or more configuration differences between the master private network and the mirror private network by comparing a first hierarchical set of dependencies corresponding to the master private network and a second hierarchical set of dependencies corresponding to the mirror private network; and
   implementing the configuration changes corresponding to the events received over the private backbone network by modifying the configuration of the mirror private network based on the one or more configuration differences using a dependency model, the dependency model determining an order in which to implement the configuration differences.

2. The computer-implemented method of claim 1, wherein the first logical data center is logically isolated from the second logical data center, such that a failure in the first logical data center is isolated from the second logical data center.

3. The computer-implemented method of claim 1, further comprising:
   determining a first configuration change corresponding to a first event received from the event bus requires mapping information to be implemented, the mapping information corresponding to at least one of a subnet mapping, port mapping, or IP address mapping;
   sending a request to a client device for the mapping information;
   receiving the mapping information from the client device; and
   implementing the first configuration change using the mapping information.

4. A computer-implemented method comprising:
   receiving a request to mirror a private network in a first area operated by a service provider to a second area operated by the service provider, the request designating the private network as a master private network and identifying a mirror private network in the second area;
   detecting one or more configuration changes to the master private network in the first area by a first instance of a mirror management service;
   generating one or more events corresponding to the one or more configuration changes to the master private network;
   publishing the one or more events to an event bus to propagate the one or more configuration changes to a second instance of the mirror management service in the second area over a transit network;
   obtaining, by the second instance of the mirror management service, the one or more events from the event bus;
   determining one or more configuration differences between the master private network and the mirror private network by comparing a first hierarchical set of dependencies corresponding to the master private network and a second hierarchical set of dependencies corresponding to the mirror private network; and
   implementing the one or more configuration changes corresponding to the one or more events by modifying the configuration of the mirror private network based on the one or more configuration differences.

5. The computer-implemented method of claim 4, wherein implementing the one or more configuration changes corresponding to the one or more events by modifying the configuration of the mirror private network based on the one or more configuration differences further comprises:
   determining an order in which to apply one or more configuration changes to the mirror private network based on the dependency model.

6. The computer-implemented method of claim 4, further comprising:
   determining at least one configuration change requires additional information to be propagated;

sending a request to a client device for the additional information;
receiving the additional information from the client device; and
propagating the at least one configuration change using the additional information.

7. The computer-implemented method of claim 4, further comprising:
sending a notification to a client device, the notification indicating the one or more configuration changes;
receiving a selection of at least one configuration change to ignore; and
propagating a subset of the one or more configuration changes, the subset not including the at least one configuration change to ignore.

8. The computer-implemented method of claim 4, wherein the request includes a plurality of mirror private networks in a plurality of areas and wherein the configuration changes are propagated to each of the plurality of mirror private networks.

9. The computer-implemented method of claim 4, wherein the configuration changes include one or more of creation of a private network, addition of resource instances to the private network, removal of resource instances from the private network, or modification of the private network.

10. The computer-implemented method of claim 4, further comprising:
receiving a request to create the master private network, the request including a first area and a plurality of resource instances to include in the master private network;
creating the master private network in the first area and provisioning the plurality of resource instances; and
in response to the request to mirror the master private network, creating the mirror private network in the second area and provisioning a second plurality of resource instances in the second area.

11. A system comprising:
a first one or more electronic devices implementing a first area; and
a second one or more electronic devices implementing a mirror management service, the mirror management service including instructions that upon execution cause the mirror management service to:
receive a request to mirror a private network in a first area operated by a service provider to a second area operated by the service provider, the request designating the private network as a master private network and identifying a mirror private network in the second area;
detect one or more configuration changes to the master private network in the first area by a first instance of a mirror management service;
generate one or more events corresponding to the one or more configuration changes to the master private network;
publish the one or more events to an event bus to propagate the one or more configuration changes to a second instance of the mirror management service in the second area over a transit network;
obtain, by the second instance of the mirror management service, the one or more events from the event bus;
determine one or more configuration differences between the master private network and the mirror private network by comparing a first hierarchical set of dependencies corresponding to the master private network and a second hierarchical set of dependencies corresponding to the mirror private network; and
implement the one or more configuration changes corresponding to the one or more events by modifying the configuration of the mirror private network based on the one or more configuration differences.

12. The system of claim 11, wherein the instructions to implement the one or more configuration changes corresponding to the one or more events by modifying the configuration of the mirror private network based on the one or more configuration differences, when executed, further cause the mirror management service to:
use a dependency model to determine an order in which to apply one or more configuration changes to the mirror private network based on the dependency model.

13. The system of claim 11, wherein the instructions, when executed, further cause the mirror management service to:
determine at least one configuration change requires additional information to be propagated;
send a request to a client device for the additional information;
receive the additional information from the client device; and
propagate the at least one configuration change using the additional information.

14. The system of claim 11, wherein the instructions, when executed, further cause the mirror management service to:
send a notification to a client device, the notification indicating the one or more configuration changes;
receive a selection of at least one configuration change to ignore; and
propagate a subset of the one or more configuration changes, the subset not including the at least one configuration change to ignore.

15. The system of claim 11, wherein the request includes a plurality of mirror private networks in a plurality of areas and wherein the configuration changes are propagated to each of the plurality of mirror private networks.

16. The system of claim 11, wherein the configuration changes include one or more of creation of a private network, addition of resource instances to the private network, removal of resource instances from the private network, or modification of the private network.

* * * * *